United States Patent [19]

Wolk

[11] 3,945,273
[45] Mar. 23, 1976

[54] TIRE REPAIR TOOL
[75] Inventor: Charles M. Wolk, Canton, Ohio
[73] Assignee: E-Z Manufacturing Company, Canton, Ohio
[22] Filed: Dec. 4, 1974
[21] Appl. No.: 529,282

[52] U.S. Cl. ................................................ 81/15.7
[51] Int. Cl.² .......................................... B60C 25/16
[58] Field of Search ........................... 81/15.2, 15.7

[56]     References Cited
        UNITED STATES PATENTS
3,029,671  4/1962  Clifford ............................. 81/15.7
3,400,445  9/1968  Crandall ......................... 81/15.7 X
3,545,314  12/1970 Docter ............................... 81/15.7
3,855,881  12/1974 Buckland .......................... 81/15.7

Primary Examiner—Al Lawrence Smith
Assistant Examiner—Roscoe V. Parker
Attorney, Agent, or Firm—Teare, Teare & Sammon

[57]     ABSTRACT

A tire repair tool having a tube for insertion into a vehicle tire, and through which tire repair material may be inserted into a tire. The tube has one end fastened to a handle by a member which is removable whereby the tube may be replaced without replacing the handle.

9 Claims, 7 Drawing Figures

3,945,273

TIRE REPAIR TOOL

BACKGROUND OF THE INVENTION

Heretofore, tire repair tools have included a tube which is adapted to be inserted into a tire to provide a passageway for the introduction of tire repair material. Such tubes have been rigidly connected to a handle by means of which the tube could be inserted through the wall of the tire. With the advent, however, of steel belted tires, the tubes, being relatively thin in wall thickness, have fractured easily due to the increase in pressure required to force the tube through the tire wall. When such fracture occurred, it was necessary to discard the entire assembly of tube and handle thus requiring each tire repair station to maintain a supply of the handle and tube assemblies for replacement purposes.

SUMMARY OF THE INVENTION

The invention of the present application has reduced the loss incident to the fracture of a tube by making the tube removable from the handle and enabling the replacement tube to be quickly installed on the handle. This reduces the necessity for the customer to carry tube and handle assemblies in stock and to carry only relatively inexpensive tubes for replacement purposes.

DESCRIPTION OF THE PREFERRED EMBODIMENT

The tire repair tool which embodies the invention of the present application includes a hand actuated tubular member which is adapted to be inserted through the wall of a vehicle tire at the point of injury to the tire. The tube, when inserted into the tire, provides a passageway through which a tire repair strip may be inserted by means of a forked needle until the trailing part of the material is approximately flush with the outer surface of the tire. The needle is then withdrawn, whereupon the tube is withdrawn, thereby leaving the tire repair material embedded within the tire.

Figure 1:
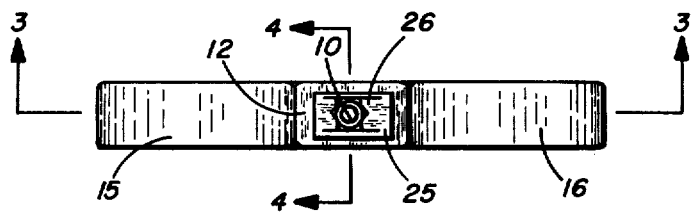
FIG. 1 is a top plan view of a tube assembled onto a retainer or handle in accordance with the invention set forth in the present application.
Figure 4:
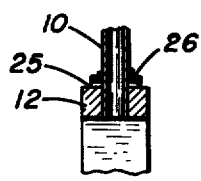
FIGS. 3 and 4 are sections taken on planes indicated by the correspondingly numbered lines in FIG. 1.
Figure 2:
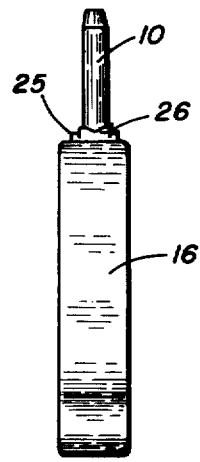
FIG. 2 is an end view of the assembly shown in FIG. 1.
Figure 3:
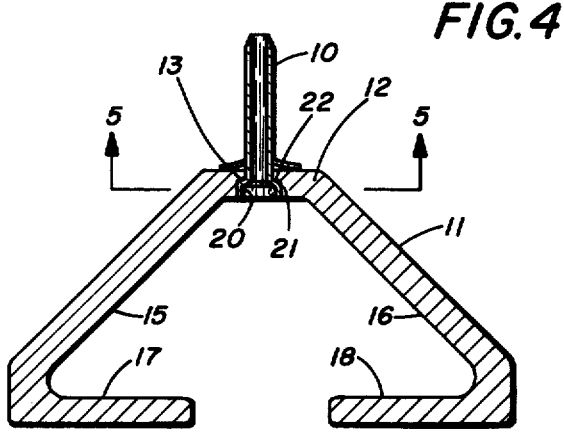

In the embodiment shown in the drawings, a tube 10 is fastened at one end to a retainer 11 which in FIGS. 1, 2 and 3 is shown as an open frame embodying a one-piece structure having a portion 12 which is provided with an aperture 13 through which the tube extends. Arms 15 and 16 extend laterally from the ends of the portion 12 and terminate in inturned portions 17 and 18 respectively and provide finger grips by means of which the tool may be manipulated.

Figure 5:
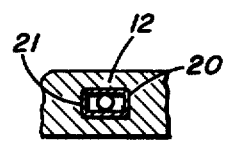
FIG. 5 is a section taken on a plane indicated by the line 5—5 in FIG. 3.
Figure 7:
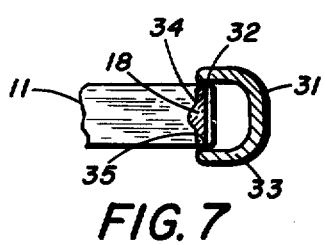
FIG. 7 is a section taken on a plane indicated by the line 7—7 in FIG. 6.
Figure 6:
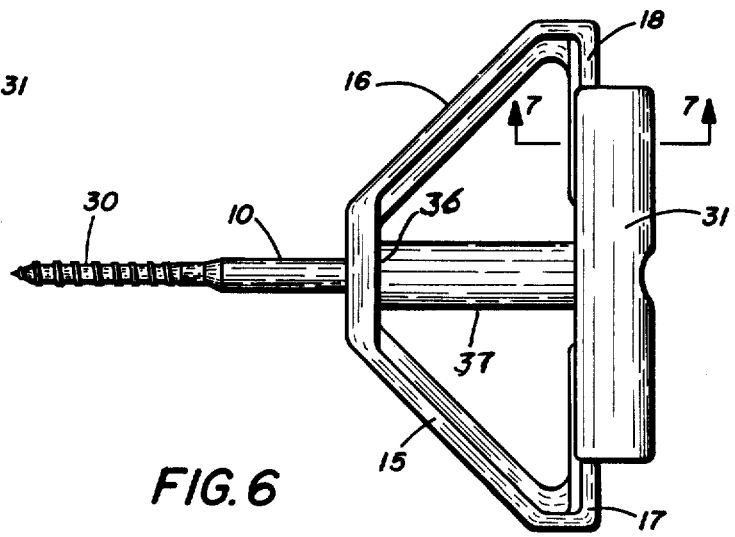
FIG. 6 is a side view of the assembly of FIG. 1 with a tire wall piercing member having a threaded shaft which is affixed to a second handle for coacting with the assembly of FIG. 1, in making a tire repair.

The tube 10 is shown as being cylindrical except for the portion thereof adjacent the retainer, the latter of which is non-circular in shape and preferably is rectangular in cross-section as shown at 20 in FIG. 5, and as fitting into a complementary shaped opening 21 in the portion 12. Such arrangement provides a shoulder 22 in the portion 12 which serves to limit movement of the tube in an axial direction outwardly from the retainer, and also serves to prevent rotation of the tube with reference to the retainer.

The tube is shown as being attached to the retainer by a fastener which has a generally rectangular base 25 with upwardly projecting resilient fingers 26 which yield sufficiently to enable the tube to be passed through the opening between the ends of the fingers and which then grip the tube frictionally so as to prevent it from moving axially in a direction inwardly of the retainer. Such fastener may be removed for replacing the tube 10 by prying upwardly upon the fingers 26 and sliding the fastener off the tube, whereupon the fastener may be re-used for attaching a new tube to the retainer.

To facilitate introduction of the tube 10 through the wall of the tire, the threaded end 30 of a gimlet is inserted through the tube until the end 36 of an enlarged shank portion 37 engages one end of the tube 10 at which time the handle 31 of the gimlet engages the inturned portions 17 and 18 respectively of the retainer. At the same time the inner side walls 32 and 33 of the handle 31 engage the top and bottom faces 34 and 35 respectively of the retainer inturned portions 17 and 18. At such time, the handle of the gimlet and the retainer are interlocked against rotation with respect to each other, thus enabling the assembly to be manually rotated until the spiral portion of the gimlet shank has passed through the wall of the tire. The assembly is then pushed axially into the tire, thereby moving the tube through the tire wall until the retainer portion 12 engages the outer face of the tire wall. During such operation, the end 36 of the shank portion 37 is pushing against the adjacent end of the tube 10 and is operating to restrain the tube from moving with relation to the retainer and away from the tire. Tire repair material may then be inserted through the tube after which the tube is withdrawn, thus leaving the repair material embedded in the wall of the tire.

A suitable form of tire repair material may comprise a strip of flat rubber-like material which is fitted into a forked opening at the end of a needle in the customary manner. After the repair material is inserted, the needle is withdrawn and the tube is withdrawn, thereby leaving the repair material embedded within the wall of the tire and filling the opening therein.

I claim:

1. A tire repair tool comprising,
   a tube adapted to be inserted into a tire and to form a passageway through which tire repair material may be inserted through a wall of the tire,
   a tube retainer including a handle,
   an attaching member for attaching one end of the tube to the handle,
   said attaching member being detachable from the handle to permit replacement of a fractured tube,
   the handle has an aperture through which the tube extends and has a shoulder adjacent the aperture,
   the tube has a shoulder which engages the shoulder on the handle to limit movement of the tube axially with respect to the handle in one direction, and wherein,
the attaching member operates to limit movement of the tube axially with relation to the handle in the opposite direction.

2. A tire repair tool according to claim 1, wherein
at least a portion of the aperture being non-circular in cross section and
the tube having a portion adjacent one end thereof non-circular in cross-section and coacting with the non-circular portion of the aperture to prevent rotation of the tube with relation to the handle.

3. A tire repair tool according to claim 1, wherein
the aperture in the handle is non-circular in cross section for a portion of its length and is cylindrical for the remaining portion of its length,
the junction of the cylindrical and non-circular portions forming the shoulder which operates to limit movement of the tube axially with reference to the handle.

4. The tire repair tool according to claim 1, wherein
the attaching member has a base and has resilient fingers which are integral with the base and project outwardly therefrom to receive and grip the tube,
said attaching member being slidable along the tube toward the handle until the base engages the handle.

5.. A tire repair tool according to claim 4, wherein
said fingers project inwardly toward one another defining an opening therebetween for receiving said tube therein,
said fingers being deformable outwardly in a direction away from said tube retainer to increase the size of said opening to enable said attaching member and tube to move relative to one another.

6. A tire repair tool according to claim 1, including a gimlet for assembly with the tube retainer,
said gimlet having a shank which is adapted to extend through the tube and having a handle with shoulders thereon which coactingly engage the tube retainer for preventing rotation of the gimlet with respect to the tube retainer, when the gimlet is assembled onto the tube retainer.

7. A tire repair tool according to claim 1, including a gimlet adapted for assembly with said tube retainer,
said gimlet having a shank which is adapted to extend through the tube, and
said shank has a shoulder thereon which is adapted to engage one end of the tube and to resist movement of it outwardly from the tire and relative to the tube retainer, when the tube and gimlet are moved as a unit through the wall of the tire.

8. A tire repair tool according to claim 6, wherein
said tube retainer comprises an open frame including a pair of arms which extend laterally outwardly from said aperture, and
said arms terminate in inturned portions defining said handle for manipulating said tool.

9. A tire repair tool according to claim 8, wherein
said shoulders of said handle of said gimlet are adapted for interlocking engagement with said inturned portions of said tube retainer to prevent rotation of said gimlet with respect to said tube retainer when said inturned portions and said handle of said gimlet are interlocked with one another.

* * * * *